United States Patent [19]

Allen et al.

[11] Patent Number: 4,692,195

[45] Date of Patent: Sep. 8, 1987

[54] METHOD FOR REPAIRING AND REINFORCING A PLASTIC TOTE

[76] Inventors: Danny T. Allen, 2519 Cass St., Fort Wayne, Ind. 46808; Mark S. Allen, 1823 Woodhaven Dr., Fort Wayne, Ind. 46819

[21] Appl. No.: 872,116

[22] Filed: Jun. 9, 1986

[51] Int. Cl.⁴ .............................................. B32B 35/00
[52] U.S. Cl. ................................. 156/98; 29/402.11; 156/94; 220/71; 220/73; 264/36; 428/63
[58] Field of Search ....................... 29/402.09, 402.11; 156/94, 98; 220/71, 73; 264/36; 428/63

[56] References Cited

U.S. PATENT DOCUMENTS

| | | | |
|---|---|---|---|
| 3,276,941 | 10/1966 | Burns. | |
| 3,286,876 | 11/1966 | Ring | 220/73 |
| 3,341,063 | 9/1967 | Voorhees. | |
| 3,501,047 | 3/1970 | Raabe | 220/71 |
| 3,607,570 | 9/1971 | Hildebrandt et al. | 156/500 |
| 3,754,699 | 8/1973 | Moore | 220/71 X |
| 3,997,074 | 12/1976 | Shead | 220/71 |
| 4,373,642 | 2/1983 | Wolters et al. | 220/72 |
| 4,409,270 | 10/1983 | Faber et al. | 428/63 |
| 4,619,371 | 10/1986 | Rehrig | 220/71 |

*Primary Examiner*—Robert A. Dawson
*Attorney, Agent, or Firm*—Jeffers, Hoffman & Niewyk

[57] ABSTRACT

A method for repairing and reinforcing a torn plastic tote is provided. The edges of the tears are bevelled and the tears are then welded with a plastic material which is of the same type as the material from which the plastic tote is made. A strip of plastic material is formed into a closed loop by welding the ends of the loop together. The loop is placed around the upstanding walls, preferably around the upper edge thereof and the loop is then spot welded to the upstanding walls. In an alternative embodiment, only a loop is placed around the tote and the tears are not welded.

9 Claims, 6 Drawing Figures

METHOD FOR REPAIRING AND REINFORCING A PLASTIC TOTE

BACKGROUND OF THE INVENTION

This invention relates to a method for repairing and reinforcing plastic tote boxes or totes. More specifically, the invention relates to a method for reconditioning plastic tote boxes which have been torn during use.

Material handling tote boxes have become quite common in modern manufacturing and warehousing plants. Such tote boxes are used for transporting and temporarily storing a variety of items in warehousing and manufacturing operations. Tote boxes are often designed to be nested or stacked and are generally made of a plastic material such as high density polyethylene and the like. However, the plastic materials of which the tote boxes are made are quite often subject to deformation or creep and cannot withstand large forces placed thereon. Therefore, in use, such tote boxes often tear. When tote boxes become so torn as to be unuseable, they are generally discarded and disposed of. Therefore, the life of plastic tote boxes is rather limited especially when they are used to store and transport heavy articles or with rough use. Therefore, a substantial amount of funds are commonly expended in replacing torn or worn out tote boxes.

In the prior art, the approach to solving this problem has been to manufacture plastic tote boxes with reinforcements in selected areas so that the totes will not tear and wear out as readily. Such reinforcement methods include using metal reinforcing rods or tubes in areas of the tote box where the applied forces are generally greatest, such as along the corners and the upper edges of the upstanding sidewalls. Other methods of reinforcement have been to use corner stiffeners made from plastic material or to use complex rib or web reinforcement configurations. However, such reinforcement methods add costs to the manufacture of plastic totes, which is, of course, undesirable. Furthermore, if tears should occur in the totes in areas which have not been reinforced, the reinforced totes must still be disposed of.

It is, therefore, desired to provide a method for reconditioning torn plastic totes by repair and reinforcement whereby torn totes need not be disposed of but may be put to further use and have their useful life extended.

SUMMARY OF THE INVENTION

The present invention provides a method for repairing and reinforcing plastic totes.

The present invention, in one form thereof, provides a method for repairing a torn plastic tote by preparing the tears for plastic welding, welding the tears with a plastic material, providing a band of plastic reinforcing material around the upstanding sidewalls of the tote and securing the band to the sidewalls. In one type of repair, no welding of the tears is done, the only process is attaching a loop or band to the outer upper edge of the sidewalls of the tote.

The present invention, in one form thereof, further provides a method for repairing and reinforcing a torn plastic tote including the steps of bevelling the edges of the tears, and welding the tear with plastic material of the same type as the plastic tote material. A closed loop of plastic reinforcing material is then placed around the upstanding walls and is welded to the walls.

One advantage of the method according to the present invention is that it constitutes a considerable savings as, instead of disposing of torn plastic totes, the totes may be repaired and put to further use.

Another advantage of the present invention is that the plastic totes, when repaired and reinforced, are generally stronger than when they are new. The reinforcing band will often maintain the functionability of the tote even after a new tear occurs, providing the tear doesn't extend the full length of the sidewall (or into the bottom of the tote) and the band is still intact.

The present invention, in one form thereof, comprises a method for repairing and reinforcing a plastic tote which includes a plurality of upstanding sidewalls, at least one of which includes a tear therein. The method comprises bevelling the edges of the tear, welding the tear with a plastic material of a type which is compatible with the material of which the plastic tote is made, providing a closed loop of plastic material, placing the loop around the upstanding walls and then welding the loop to the upstanding walls.

The present invention, in one form thereof, further provides a method for reinforcing a plastic tote which includes at least one upstanding wall. The method includes providing a strip of plastic material, placing the strip around the wall, and securing the strip to the wall.

The present invention, in one form thereof, still further provides a method for repairing and reinforcing a plastic tote, wherein the tote includes at least one upstanding wall which includes at least one tear therein. The method includes bevelling the edges of the tear, welding the tear with plastic material, providing a strip of plastic material and then securing the strip of plastic material to the wall.

It is an object of the present invention to provide a method for repairing and reinforcing plastic totes which have become unuseable due to tearing.

Another object of the present invention is to provide a method for repairing and reinforcing plastic totes to eliminate the need to dispose of torn plastic totes.

BRIEF DESCRIPTION OF THE DRAWINGS

The above-mentioned and other features and objects of this invention and the manner of attaining them, will become more apparent and the invention itself will be better understood by reference to the following description of an embodiment of the invention taken in conjunction with the accompanying drawings wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Figure 1:
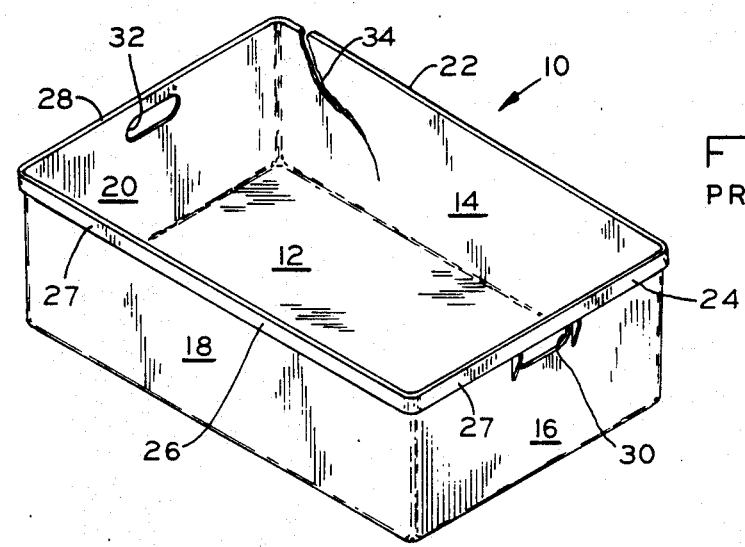
FIG. 1 is a perspective elevational view of a plastic tote including a tear in one of the sidewalls thereof.
Figure 2:
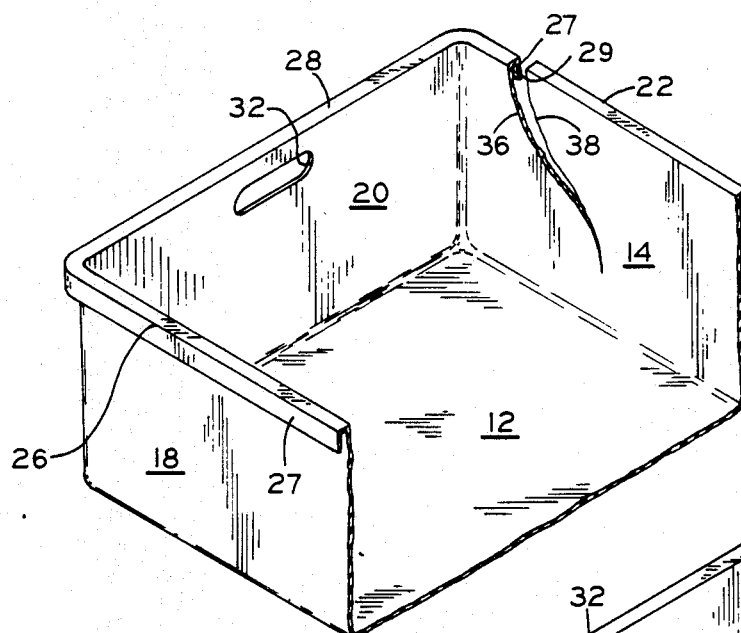
FIG. 2 is an enlarged partial view of the tote of FIG. 1 with a portion thereof broken away to show the torn portion of the tote in detail.
Figure 3:
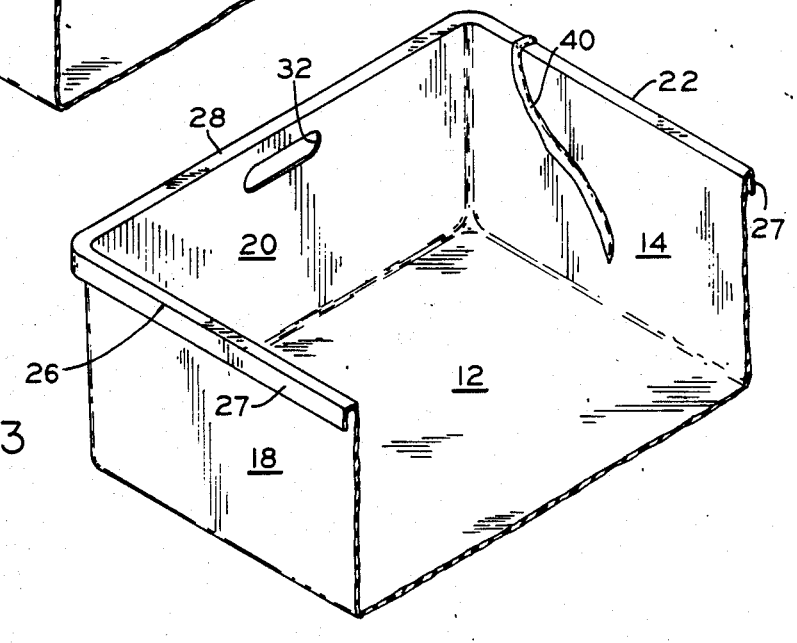
FIG. 3 is an enlarged partial view of a repaired tote with a portion thereof broken away to show a repaired tear.
Figure 5:
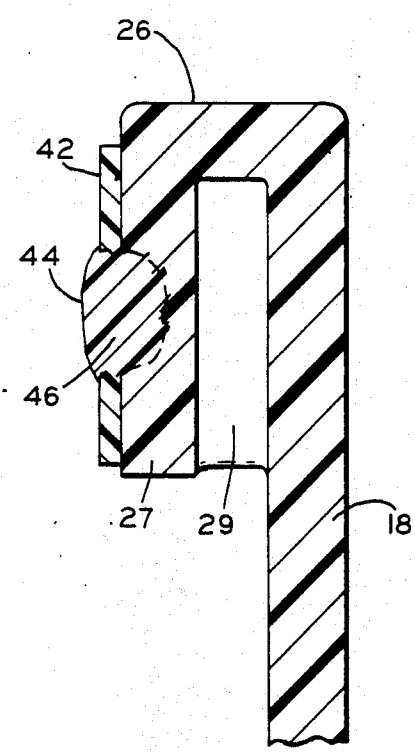
FIG. 5 is an enlarged view in cross section of an edge of a tote including the reinforcing band taken along lines 5—5 of FIG. 4.
Figure 6:
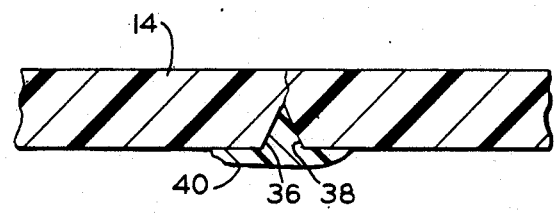
FIG. 6 is an enlarged view in cross section of a repaired tear taken along lines 6—6 of FIG. 4.

Referring to FIG. 1, a prior art plastic tote is shown including a bottom wall 12 and four upstanding sidewalls 14, 16, 18, and 20. Such plastic totes are generally rectangular in shape and are commonly 21-24 inches long by 15-20 inches wide by 6-12 inches high. The sidewalls are generally provided with turned over edges along the upper portions thereof for ease in grasping the tote and for reinforcement of the sides. Edges 22, 24, 26, and 28, shown in the tote of the preferred embodiment, include turned over portions 27 as best illustrated in the enlarged detailed showing of FIG. 5. A space 29 is provided between the turned over portion 27 and the upstanding sidewall 14. Two of the sidewalls 16 and 20 are also provided with handles 30 and 32, as shown, for grasping the tote so that it may be easily moved. Tote bottom 12 may be either perforate or imperforate as desired.

The plastic tote may be manufactured of a relatively inexpensive material with good molding characteristics such as high density polyethylene or the like. However, such materials are characteristically too weak to withstand heavy loading and will tear in normal use.

As further shown in FIG. 1, a side 14 includes a tear 34, which substantially reduces the strength of sidewall 14. The tote is repaired as follows. The edges of the tear or break on the inside of the tote are bevelled at approximately a 60° angle. Such bevelling may be done by removing plastic material with a sharp tool such as a scraper or the like. The breaks or tears are then welded together by means of a conventional thermoplastic speed welding process including a compressed gas such as air. Such welding may be accomplished, by way of example, with a speed welding gun, model number 30-300 +NHS-1, High Speed Tip, manufactured and sold by Laramy Products Co., Inc., of Lyndonville, Vt. The thermoplastic welding material should be compatible with the plastic tote material. To weld some plastics, it is necessary to provide inert gas, preferably nitrogen, in place of compressed air, which requires additional equipment. Thus, in repairing a high density polyethylene tote, a high density, polyethylene welding material may be used. However, any other type of compatible thermoplastic material could also be used for welding the tears. The weld is preferably made from the inside of the tote so that it leaves the outside of the tote smooth.

Figure 4:
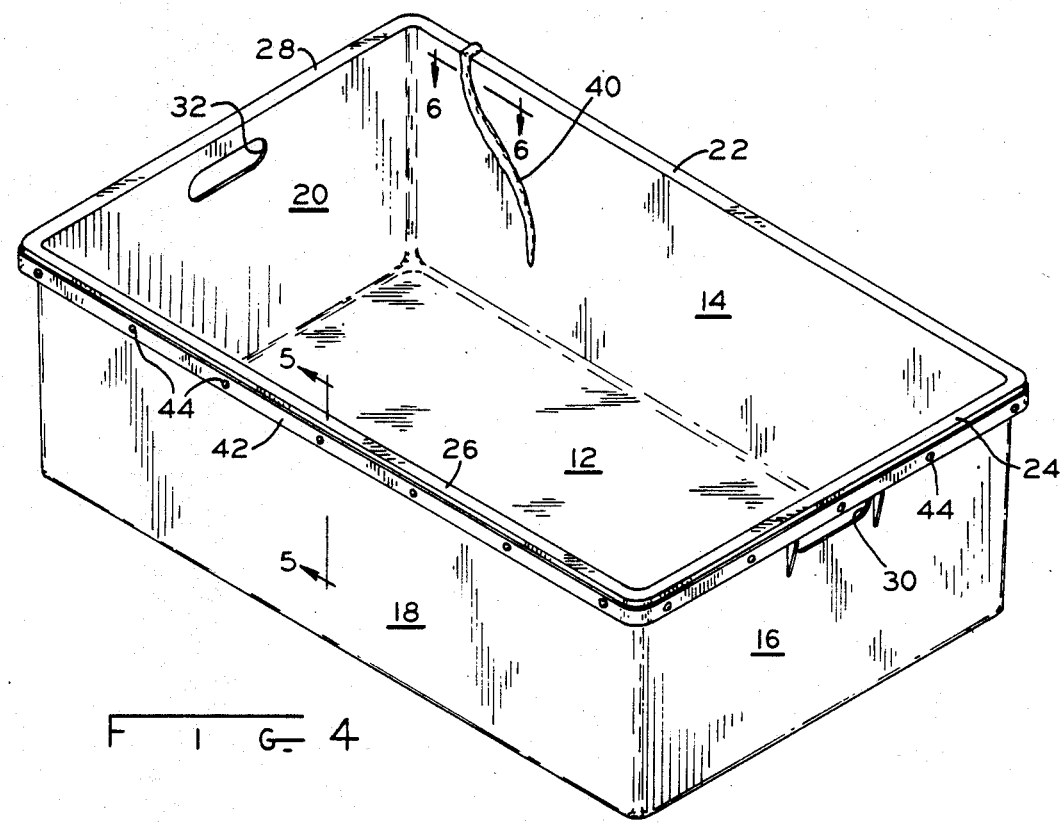
FIG. 4 is an elevational perspective view of a repaired tote showing a repaired tear and showing a reinforcing band around the upper edge of the tote.

All of the high spots on the outside of the tote around the rim of the tote are now ground off to provide a smooth, flat surface. Such grinding may either be done by hand or may be done by means of a mechanical grinder. A thin strip of high density polyethylene or other suitable plastic material is now provided. In a preferred embodiment, the width of the strip was in the range of 23/32-¾ inch and the thickness of the strip was in the range of 3/32-⅛ inch. The bands from which the loops are made may be cut from a sheet of high density polyethylene material or may be extruded, as desired. The material is cut to length and a loop 42 is formed by welding the ends of the strip together. Loop 42 is sized so that it just fits snuggly around the edges 22-28 of tote 10. Loop 42 is then secured to the rim of the tote by welding with an ultrasonic spot welding process. In the tote shown in FIG. 4 wherein the tote edges are dimensioned 21 inches by 15 inches, four welds 44 are made on each short end of the tote and seven welds are made on each long side of the tote. However, it should be understood that more or fewer of these welds may be provided. By referring to FIG. 5, it can be seen that spot welded material 46 of spot welds 44 penetrates loop 42 and edge portion 27 and retains loop 42 securely in place.

It can thus be seen that a very effective yet simple method for repairing and reinforcing plastic totes has been provided. Applicant has found that the tote, when repaired, is stronger and holds up better under normal use than when the tote was new before the reinforcing band was placed thereon. Therefore, it should be understood that the reinforcing method may also be used on totes which have not been torn so as to provide a stronger edge for new totes. It should also be understood that reinforcing bands may be used in more than one area of the tote to give the tote further strength.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A method for repairing and reinforcing a plastic tote, said tote including a plurality of upstanding sidewalls, at least one of said sidewalls including at least one tear therein, said method comprising:
   bevelling the edges of said tear;
   welding said tear with a plastic material of a type which is compatible with the material of said plastic tote;
   providing a closed loop of plastic material;
   placing said loop around said plurality of upstanding walls; and
   welding said loop to said upstanding walls.

2. The method according to claim 1 wherein said loop is composed of the same material as said tote.

3. The method of claim 1 wherein said loop is formed of a strip of plastic material, the ends of said strip being welded together.

4. The method according to claim 1 wherein said loop is placed around an upper portion of said walls.

5. A method for repairing and reinforcing a plastic tote, said tote including at least one upstanding wall, said wall including at least one tear therein, the method comprising:
   bevelling the edges of said tear;
   welding said tear with plastic material;
   providing a strip of plastic material; and
   securing said strip to said wall.

6. The method according to claim 5 wherein said strip is composed of the same material as said tote.

7. The method according to claim 5 including the step of forming said strip into a closed loop before said strip is placed on said wall.

8. The method according to claim 5 wherein said strip is placed around the upper edge of said wall.

9. The method according to claim 5 wherein said strip is welded to said wall, and wherein the material for welding said strip is of the same type as the material of the plastic tote.

* * * * *